United States Patent
Kemmerer et al.

(10) Patent No.: US 12,212,912 B2
(45) Date of Patent: *Jan. 28, 2025

(54) WEARABLE AUDIO DEVICE PLACEMENT DETECTION

(71) Applicant: Bose Corporation, Framingham, MA (US)

(72) Inventors: Jeremy Kemmerer, Holliston, MA (US); Miriam Israelowitz, Brookline, MA (US); Joseph H. Cattell, Somerville, MA (US)

(73) Assignee: Bose Corporation, Framingham, MA (US)

( * ) Notice: Subject to any disclaimer, the term of this patent is extended or adjusted under 35 U.S.C. 154(b) by 160 days.

This patent is subject to a terminal disclaimer.

(21) Appl. No.: 17/858,004

(22) Filed: Jul. 5, 2022

(65) Prior Publication Data
US 2022/0400329 A1 Dec. 15, 2022

Related U.S. Application Data

(63) Continuation-in-part of application No. PCT/US2021/034049, filed on May 25, 2021, which is a continuation of application No. 16/882,673, filed on May 25, 2020, now Pat. No. 11,202,137.

(51) Int. Cl.
*H04R 1/10* (2006.01)
*G06F 3/01* (2006.01)
*G06F 3/16* (2006.01)
*H04R 1/02* (2006.01)

(52) U.S. Cl.
CPC ........... *H04R 1/1016* (2013.01); *G06F 3/011* (2013.01); *G06F 3/017* (2013.01); *G06F 3/16* (2013.01); *H04R 1/028* (2013.01)

(58) Field of Classification Search
CPC ............................ H04R 1/1016; H04R 1/028
See application file for complete search history.

(56) References Cited

U.S. PATENT DOCUMENTS 9,838,812 B1 * 12/2017 Shetye ................. H04R 29/001
2019/0052952 A1 * 2/2019 Freund .................. H04R 5/023

FOREIGN PATENT DOCUMENTS

EP 3291573 A1 * 3/2018 ........... H04R 1/1016

* cited by examiner

*Primary Examiner* — Sunita Joshi
(74) *Attorney, Agent, or Firm* — Hoffman Warnick LLC

(57) ABSTRACT

An earbud with an electro-acoustic transducer for producing sound, a proximity sensor that is configured to detect when the earbud is close to a user's skin, an orientation sensor that is configured to detect an orientation of the earbud, and a processor that is configured to estimate, based on the proximity sensor and the orientation sensor, whether the earbud has been inserted into the user's ear canal.

26 Claims, 7 Drawing Sheets

WEARABLE AUDIO DEVICE PLACEMENT DETECTION

CROSS-REFERENCE TO RELATED APPLICATIONS

This application is a continuation in part of and claims priority of International Patent Application PCT/US2021/034049 filed on May 25, 2021, which itself claimed priority of U.S. patent application Ser. No. 16/882,673 filed on May 25, 2020, now issued as U.S. Pat. No. 11,202,137 issued on Dec. 14, 2021. The entire disclosures of both prior applications are hereby incorporated by reference in their entireties and for all purposes.

BACKGROUND

This disclosure relates to a wearable audio device.

Wearable audio devices are designed to function best when they are in their proper use position on the body, and when the user has stopped handling the device.

SUMMARY

All examples and features mentioned below can be combined in any technically possible way.

In one aspect a wearable audio device includes an electro-acoustic transducer for producing sound, a proximity sensor that is configured to detect when the wearable audio device is close to a user, an orientation sensor that is configured to detect an orientation of the wearable audio device, an internal microphone positioned within a housing of the wearable audio device and configured to detect sound in a cavity formed at least in part by a portion of the housing, and a processor that is configured to estimate: (i) based on the proximity sensor and the orientation sensor, whether the wearable audio device is in place on the user's body, and (ii) based on the internal microphone, whether the user has completed handling of the wearable audio device.

Some examples include one of the above and/or below features, or any combination thereof. In an example the proximity sensor comprises an infrared sensor. In an example the orientation sensor comprises an inertial measurement unit (IMU). In an example the IMU comprises an accelerometer that is used to detect the wearable audio device orientation. In an example the proximity sensor has an output, and the estimation by the processor of whether the wearable audio device is in place on the user's body is in part based on a level of the proximity sensor output. In an example after the processor estimates whether the wearable audio device is in place on the user's body the processor is configured to enable predetermined wearable audio device functions. In an example the predetermined wearable audio device functions comprise at least one of: telephone call answering capability, Bluetooth connection, beamforming of microphones carried by the wearable audio device, playback of audio received from an external audio source, enablement of user interface functions, and tuning of an active noise reduction system.

Some examples include one of the above and/or below features, or any combination thereof. In some examples the wearable audio device further comprises an external microphone that is configured to sense sound outside the housing, and the processor estimation of whether the wearable audio device is in place on the user's body is further based on a transfer function between the external microphone and the internal microphone. In an example the processor is further configured to cause the electro-acoustic transducer to produce sound on which the transfer function is based. In an example the transfer function is determined at a frequency of up to 1,000 Hz. In an example the processor is further configured to cause the electro-acoustic transducer to produce sound at two different frequencies, wherein a first frequency is at least 1,500 Hz and the processor is configured to determine, based at least in part on the first frequency, if a wearable audio device nozzle is blocked, and a second frequency is no more than 1,000 Hz and the processor is configured to determine, based at least in part on the second frequency, if the wearable audio device is in place on the user's body.

Some examples include one of the above and/or below features, or any combination thereof. In an example the produced sound is part of a wearable audio device startup tone sequence. In an example the processor estimation of whether the wearable audio device is in place on the user's body comprises two sequential steps, a first step based at least on the proximity sensor, the orientation sensor, and the internal microphone, and a second step based at least on the internal microphone and the external microphone. In some examples the processor is configured to initiate a first group of wearable audio device functions based on the first step and a second group of wearable audio device functions based on the second step, wherein the functions of the second group are different than the functions of the first group. In an example the first and second groups of functions comprise at least one of: telephone call answering capability, Bluetooth connection, beamforming of microphones carried by the wearable audio device, playback of audio received from an external audio source, enablement of user interface functions, and tuning of an active noise reduction system. In an example during at least the first step the internal microphone is monitored at frequencies in the 0-20 Hz range.

In another aspect a method of detecting when a wearable audio device is in place on the user's body, wherein the wearable audio device comprises an electro-acoustic transducer for producing sound, a proximity sensor that is configured to detect when the wearable audio device is close to a user, an orientation sensor that is configured to detect an orientation of the wearable audio device, an internal microphone positioned within a housing of the wearable audio device and configured to detect sound in a cavity formed at least in part by a portion of the housing, and an external microphone that is configured to sense sound outside the housing, includes estimating, based on the proximity sensor, the orientation sensor, and the internal microphone, whether the wearable audio device is in place on the user's body, and estimating, based on the internal microphone, whether the user has completed handling of the wearable audio device.

Some examples include one of the above and/or below features, or any combination thereof. In an example the processor is further configured to cause the electro-acoustic transducer to produce sound after the processor has estimated that the wearable audio device is in place on the user's body, and wherein the processor is further configured to compute a transfer function between the external microphone and the internal microphone over a specified frequency or frequency range of the produced sound. In an example the processor estimation of whether the wearable audio device is in place on the user's body comprises two sequential steps, a first step based at least on the proximity sensor, the orientation sensor, and the internal microphone, and a second step based at least on the internal microphone and the external microphone, and wherein the processor is configured to initiate a first group of wearable audio device functions based on the first step and a second group of wearable audio device functions based on the second step, wherein the functions of the second group are different than the functions of the first group.

In another aspect a wearable audio device (e.g., headphones) includes an electro-acoustic transducer for producing sound, a proximity sensor that is configured to detect when the wearable audio device is close to a user, an internal microphone positioned within a housing of the wearable audio device (e.g., within an earcup of the headphones) and configured to detect sound in a cavity formed at least in part by a portion of the housing, and a processor that is configured to estimate, based on at least the proximity sensor, whether the wearable audio device is in place on the user's body, and to estimate, based on the internal microphone, whether the user has completed handling of the wearable audio device.

Some examples include one of the above and/or below features, or any combination thereof. In an example the wearable audio device further includes at least one earcup that is configured to be located on or over an ear of a wearer when the wearable audio device is placed on the head, wherein the proximity sensor and the internal microphone are both positioned in an earcup. In some examples the proximity sensor comprises a capacitive proximity sensor. In an example the capacitive proximity sensor comprises a conductive member inside an earcup of the wearable audio device. In an example the conductive member has a curved outer perimeter that mimics a curve of a human pinna. In an example the wearable audio device further includes two earcups that are configured to be located on or over an ear of a wearer when the wearable audio device is placed on the head, wherein there is an internal microphone positioned within each earcup, and wherein the estimation of whether the user has completed handling of the wearable audio device is based on an internal microphone positioned within each of the earcups.

Some examples include one of the above and/or below features, or any combination thereof. In some examples the processor is configured to initiate a first group of wearable audio device functions based on the estimation of whether the wearable audio device is in place on the user's body. In an example the processor is configured to initiate a second group of wearable audio device functions based on the estimation of whether the user has completed handling of the wearable audio device, wherein the functions of the second group are different than the functions of the first group. In an example the first and second groups of functions comprise at least one of: telephone call answering capability, Bluetooth connection, beamforming of microphones carried by the wearable audio device, playback of audio received from an external audio source, enablement of user interface functions, and tuning of an active noise reduction system.

Some examples include one of the above and/or below features, or any combination thereof. In an example during at least the estimation of whether the user has completed handling of the wearable audio device the internal microphone is monitored at frequencies in the 0-20 Hz range. In an example the proximity sensor has an output, and the estimation by the processor of whether the wearable audio device is in place on the user's body is in part based on a level of the proximity sensor output. In some examples after the processor estimates whether the wearable audio device is in place on the user's body the processor is configured to enable predetermined wearable audio device functions. In an example the predetermined wearable audio device functions comprise at least one of: telephone call answering capability, Bluetooth connection, beamforming of microphones carried by the wearable audio device, playback of audio received from an external audio source, enablement of user interface functions, and tuning of an active noise reduction system. In an example the processor is further configured to initiate an active noise reduction (ANR) filter determination procedure after an estimation that the user has completed handling the wearable audio device.

Some examples include one of the above and/or below features, or any combination thereof. In some examples the wearable audio device further includes an orientation sensor that is configured to detect an orientation of the wearable audio device. In an example the processor is further configured to estimate, based at least on the orientation sensor, whether the user has removed the wearable audio device from the user's body. In an example the processor is configured to reduce power usage based on the estimation of whether the user has removed the wearable audio device from the user's body. In an example the estimation of whether the user has removed the wearable audio device from the user's body is further based on the proximity sensor. In an example the processor estimation of whether the wearable audio device is in place on the user's body is based on the proximity sensor and the orientation sensor. In an example the orientation sensor comprises an accelerometer.

DETAILED DESCRIPTION

Figure 1:
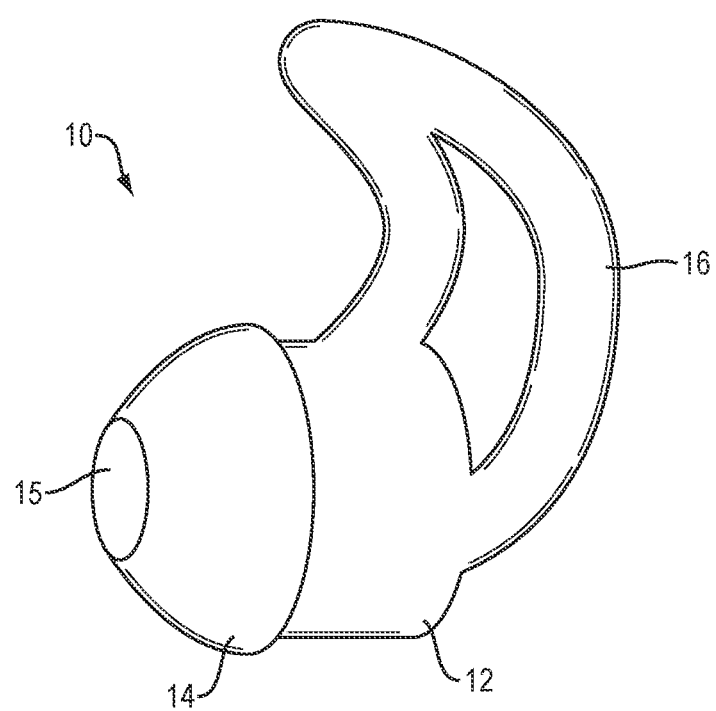
FIG. 1 is perspective view of a wearable audio device.

This disclosure relates to a wearable audio device. Some non-limiting examples of this disclosure describe a type of wearable audio device that is known as an earbud. Earbuds generally include an electro-acoustic transducer for producing sound, and are configured to deliver the sound directly into the user's ear canal. Earbuds can be wireless or wired. In examples described herein the earbuds are wireless and thus carry a power supply (generally, a rechargeable battery), a wireless communications system (which in an example is a Bluetooth-based communications system), and any necessary processing. Other aspects of earbuds that are not involved in this disclosure are not shown or described.

Some examples of this disclosure also describe a type of wearable audio device that is known as an open audio device. Open audio devices have one or more electro-acoustic transducers (i.e., audio drivers) that are located off of the ear canal opening. In some examples the open audio devices also include one or more microphones; the microphones can be used to pick up the user's voice and/or for noise cancellation. Open audio devices are further described in U.S. Pat. No. 10,397,681, the entire disclosure of which is incorporated herein by reference for all purposes.

A headphone refers to a device that typically fits around, on, or in an ear and that radiates acoustic energy directly or indirectly into the ear canal. Headphones are sometimes referred to as earphones, earpieces, headsets, earbuds, or sport headphones, and can be wired or wireless. A headphone includes an electro-acoustic transducer (driver) to transduce electrical audio signals to acoustic energy. The acoustic driver may or may not be housed in an earcup or in a housing that is configured to be located on the head or on the ear, or to be inserted directly into the user's ear canal. A headphone may be a single stand-alone unit or one of a pair of headphones (each including at least one acoustic driver), one for each ear. A headphone may be connected mechanically to another headphone, for example by a headband and/or by leads that conduct audio signals to an acoustic driver in the headphone. A headphone may include components for wirelessly receiving audio signals. A headphone may include components of an active noise reduction (ANR) system, which may include an internal microphone within the headphone housing. Headphones may also include other functionality, such as additional microphones for an ANR system, or one or more microphones that are used to pick up the user's voice.

In an around the ear or on the ear or off the ear headphone, the headphone may include a headband or other support structure and/or at least one housing or other structure that contains a transducer and is arranged to sit on or over or proximate an ear of the user. The headband can be collapsible or foldable, and can be made of multiple parts. Some headbands include a slider, which may be positioned internal to the headband, that provides for any desired translation of the housing. Some headphones include a yoke pivotably mounted to the headband, with the housing pivotably mounted to the yoke, to provide for any desired rotation of the housing.

An open audio device includes but is not limited to an off-ear headphone, i.e., a device that has one or more electro-acoustic transducers that are coupled to the head or ear (typically by a support structure) but do not occlude the ear canal opening. In some examples an open audio device is an off-ear headphone comprising audio eyeglasses, but that is not a limitation of the disclosure as in an open audio device the device is configured to deliver sound to one or both ears of the wearer where there are typically no ear cups and no ear buds. The wearable audio systems contemplated herein may include a variety of devices that include an over-the-ear hook, such as a wireless headset, hearing aid, eyeglasses, a protective hard hat, and other open ear audio devices.

One or more of the devices, systems, and methods described herein, in various examples and combinations, may be used in a wide variety of wearable audio devices or systems, including wearable audio devices in various form factors. Unless specified otherwise, the term active portion of a wearable audio system, as used in this document, includes headphones and various other types of wearable audio devices such as head, shoulder or body-worn acoustic devices (e.g., audio eyeglasses or other head-mounted audio devices) that include one more acoustic transducers to receive and/or produce sound, with or without contacting the ears of a user.

It should be noted that although specific implementations of wearable audio devices primarily serving the purpose of acoustically outputting audio are presented with some degree of detail, such presentations of specific implementations are intended to facilitate understanding through provisions of examples and should not be taken as limiting either the scope of the disclosure or the scope of the claim coverage.

In some examples the wearable audio device includes a proximity sensor that is configured to detect when the earbud is close to a user. In an example the proximity sensor detects the user's skin. In an example the proximity sensor is an infrared (IR) sensor that can detect when the wearable audio device is close to or against the skin of the ear. In an example the IR sensor output is within a predetermined range or at least a predetermined threshold level for an in-use-position decision to be made. In some examples the wearable audio device also includes an orientation sensor that is configured to detect an orientation of the wearable audio device. In an example the orientation is determined in three mutually orthogonal axes in space. Since the wearable audio device is designed to be worn in a particular orientation, knowing the orientation via the orientation sensor can indicate whether the device is in place. For example when an earbud is in the ear of a head being held upright, an internal orientation sensor will have a known orientation in three-dimensional space. The orientation sensor results can be within a predetermined range of nominal for the in-use-position decision to be made. The wearable audio device further includes a processor that is configured to estimate, based on the proximity sensor and the orientation sensor, whether the wearable audio device is in place on the user's body. In some examples where the wearable audio device is an earbud, the proper location is in the user's ear canal.

In some examples the wearable audio device also includes an internal microphone. In an example the internal microphone is positioned within a housing of the wearable audio device. In an example the microphone is positioned to detect sound in a cavity formed at least in part by a portion of the housing. When an internal microphone is used in the wearable audio device, the processor can also be configured to estimate whether the user has completed handling of the wearable audio device. In some examples the handling comprises putting the wearable audio device in place on the body or taking it off the body. In some examples the wearable audio device also includes an external microphone. In an example the external microphone is positioned to detect sound external to the wearable audio device housing. When an external microphone is used in the wearable audio device, the processor can also be configured to calculate an audio transfer function between the internal and external microphones, and estimate based on the transfer function if the wearable audio device is in its proper use position (e.g., in an ear).

FIG. 1 is a perspective view of a wireless in-ear earbud 10. An earbud is a non-limiting example of a wearable audio device. Earbud 10 includes body or housing 12 that houses the active components of the earbud. Portion 14 is coupled to body 12 and is pliable so that it can be inserted into the entrance of the ear canal. Sound is delivered through opening 15. Retaining loop 16 is constructed and arranged to be positioned in the outer ear, for example in the antihelix, to help retain the earbud in the ear. Earbuds are well known in the field (e.g., as disclosed in U.S. Pat. No. 9,854,345, the disclosure of which is incorporated herein by reference in its entirety, for all purposes), and so certain details of the earbud are not further described herein.

Figure 2:
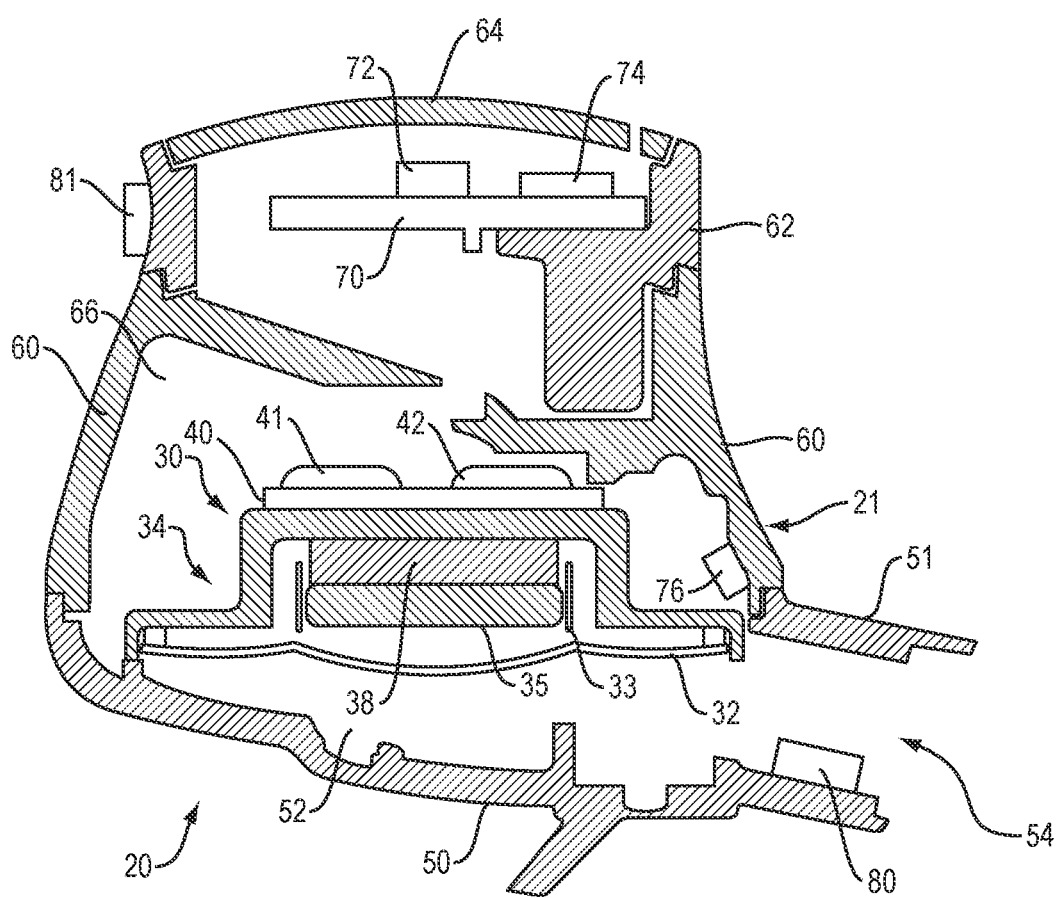
FIG. 2 is a partial cross-sectional view of elements of a wearable audio device.

FIG. 2 is a partial cross-sectional view of only certain elements of an earbud 20 that are useful to a better understanding of the present disclosure. Earbud 20 comprises housing 21 that encloses electro-acoustic transducer (audio driver) 30. Housing 21 comprises front housing portion 50 and rear housing portions 60 and 62. Transducer 30 has diaphragm 32 that is driven in order to create sound pressure in front cavity 52. Sound pressure is directed out of front housing portion 50 via sound outlet 54. Internal microphone 80 is located inside of housing 21. In an example microphone 80 is in sound outlet 54, as shown in FIG. 2. External microphone 81 is configured to sense sound external to housing 21. In an example interior microphone 80 is used as a feedback microphone for active noise reduction, and exterior microphone 81 is used as a feed-forward microphone for active noise reduction. An earbud, such as shown by earbud 10 in FIG. 1, typically includes a pliable tip (not shown) that is engaged with neck 51 of housing portion 50, to help direct the sound into the ear canal. Earbud housing 21 further comprises a rear enclosure made from rear housing portions 60 and 62, and grille 64. Note that the details of earbud 20 are exemplary of aspects of earphones and are not limiting of the scope of this disclosure, as the present in-ear detection can be used in varied types and designs of earbuds and earphones and other wearable audio devices.

Transducer 30 further comprises magnetic structure 34. Magnetic structure 34 comprises transducer magnet 38 and magnetic material that functions to confine and guide the magnetic field from magnet 38, so that the field properly interacts with coil 33 to drive diaphragm 32, as is well known in the electro-acoustic transducer field. The magnetic material comprises cup 36 and front plate 35, both of which are preferably made from a material with relatively high magnetic susceptibility, also as is known in the field. Transducer printed circuit board (PCB) 40 carries electrical and electronic components (not shown) that are involved in driving the transducer. Pads 41 and 42 are locations where wires (not shown) can be coupled to PCB 40.

In an example an inertial measurement unit (IMU) 72 is used to detect the orientation in three-dimensional space of the earbud. An IMU can include a three-axis accelerometer that can be used to determine orientation. Using accelerometers to determine an orientation of a device that includes or carries the accelerometers is known in the field and so is not further described herein. An IMU can also include a gyroscope, or three gyroscopes that are configured to determine rotational velocity about three mutually orthogonal axes. Gyroscopes can additionally or alternatively be used to determine the earbud orientation. Using gyroscopes to determine an orientation of a device that includes or carries the gyroscope is known in the field and so is not further described herein. In an example IMU 72 is mounted on PCB 70, although the IMU could be located elsewhere in or on the earbud.

In some examples proximity sensor 76 is used to detect when earbud 20 is close to the user's skin. In an example proximity sensor 76 can be an infrared (IR) sensor or a capacitive sensor. An IR sensor can be used to detect close proximity to skin while a capacitive sensor can detect when the device is touching the skin. An IR sensor can be used to detect when the earbud is in close proximity to the skin. Since an earbud needs to be in the ear when it is in the proper use position, parts of the earbud will be in contact with the skin, or close to the skin. Locating an IR sensor in a part of the earbud that will be in contact with or close to the skin thus allows the IR sensor to be used as a proximity sensor. In an example an IR sensor is located such that it will detect the tragus. In another example a distance sensor such as a time of flight sensor can be used to detect a distance between the wearable audio device and the desired location on the body (e.g., in the ear). Since the wearable audio device is properly located in a known location on the body (e.g., in the ear, on the ear, or elsewhere on the head), the distance from the device to the proper location should be zero or close to zero when the device is in place.

Earbud 20 also includes processor 74. In some examples processor 74 is configured to process outputs of IMU 72, proximity sensor 76, internal microphone 80, and external microphone 81. Of course the processor is typically involved in other processing needed for earbud functionality, such as processing digital sound files that are to be played by the earbud, as would be apparent to one skilled in the technical field. In an example the processor is configured to estimate based on both the proximity sensor and the orientation sensor whether the wearable audio device is properly in place on the user's body. In some examples the processor estimation of whether the wearable audio device is in place on the user's body is further based on a transfer function between the external microphone and the internal microphone. In an example the processor is configured to estimate based on the internal microphone whether the user has completed handling of the wearable audio device. In some examples the proximity sensor has an output, and the estimation by the processor of whether the wearable audio device is in place on the user's body is in part based on a level of the proximity sensor output. In an example the estimation by the processor of whether the wearable audio device is in place on the user's body is in part based on whether the proximity sensor output has reached a threshold level. For example, as the wearable audio device approaches the skin the IR sensor output will increase. For any particular IR sensor, an output that reaches a predetermined level can be equated to the sensor being within a predetermined distance of the skin.

In some examples the processor estimation of whether the wearable audio device is in place on the user's body includes multiple sequential steps. In an example the first step is based on the proximity sensor and the orientation sensor, a second step is based on the internal microphone, and a third second step is based on the internal and external microphones. In an example the processor is configured to initiate a first group of wearable audio device functions based on the first and second steps, and a second group of wearable audio device functions based on the third step. In an example the functions of the second group are different than the functions of the first group. In some examples the first and second groups of functions comprise at least one of: telephone call answering capability, Bluetooth connection, beamforming of microphones carried by the wearable audio device, playback of audio received from an external audio source, enablement of user interface functions, and tuning of an active noise reduction system.

In some examples the processor is configured to cause the electro-acoustic transducer to produce sound that is used in a high-confidence determination of whether the wearable audio device is in place. In an example this high-confidence determination takes place only after the processor has made a first level, lower confidence determination that the wearable audio device is in place on the user's body, and that the user has stopped handling the device. In an example the processor is configured to compute a transfer function between the external microphone and the internal microphone over a specified frequency range. In an example the produced sound is part of a wearable audio device startup tone sequence.

In one example the processor is configured to cause the electro-acoustic transducer to produce sound at two (or more) different frequencies for the in-location/out-of-location decisions. In an example the first frequency is at least 1,500 Hz (e.g., 1,500-3,000 Hz) and the processor is configured to determine, based at least in part on that frequency, if a wearable audio device nozzle is blocked. In an example the second frequency is less than 1,000 Hz and the processor is configured to determine, based at least in part on that frequency, if the wearable audio device is in place on the user's body. When frequencies or frequency ranges are described herein, it should be understood that the frequency or range is in many cases approximate. When a particular frequency is specified, it should be understood that the actual frequency can be about or approximately the specified frequency. One reason is that results may not differ dramatically if the actual frequency differs from the stated frequency.

The internal and external microphones can be used to detect sound that is analyzed in different ways and for different purposes. There can be multiple functions that the microphones are used for. One is to determine when the user is adjusting the wearable audio device. The internal microphone can be monitored for this function. In an example the monitoring can be at frequencies of up to 20 Hz, and the monitoring is passive; that is, the microphone is used to monitor sound internal to the wearable audio device without playing sound using the driver. When the wearable audio device is an earbud the internal microphone can be a feedback microphone located in the earbud nozzle. When the earbud is being handled (i.e., being inserted into the ear or being removed from the ear), the handling causes sound in the range of up to 20 Hz. Accordingly detecting sound in this range can be equated to detecting handling of the earbud. Also, when the earbud is inserted into the ear the cavity bounded by the driver, the earbud nozzle, the ear canal, and the eardrum becomes sealed, which causes a DC pressure spike. The DC pressure spike occurs at 0 Hz, but spreads out a bit in the frequency range. Accordingly, monitoring the internal microphone in the 0-20 Hz range is useful for one or both of estimating when the earbud is inserted into the ear and when it is no longer being handled.

A second function that the microphones can be used for is to make a higher-confidence determination that the wearable audio device is in place on the user's body. The internal and external microphones can be used for this function. In an example an audio transfer function between the external and internal microphones is determined. The determination can be at a frequency, or frequency range, where there is good transfer function magnitude value separation between in-place and out-of-place (e.g., in-ear and out-of-ear for an earbud). In an example for an earbud, at frequencies in the range of 0-1,000 Hz the transfer function magnitude differs between in-ear and out-of-ear states. Determining the transfer function in this frequency range can thus indicate with confidence whether the earbud is in the ear or not. The same principle can be used for other types of earbuds, for headphones, and for other types of wearable audio devices. The particular frequency or frequency range where there is good transfer function magnitude value separation between in-place and out-of-place will be unique for any given product. The "in-place" decision can then be made at a frequency or frequency range where there is good magnitude value separation.

Another function that the microphones can be used for is to determine if the nozzle of an earbud is blocked. An earbud nozzle can be blocked by a finger when the earbud is being handled (e.g., when it is being put in place in the ear or removed from the ear). Thus a determination of a blocked nozzle can be used as a lower confidence indication that the earbud is being handled and so is not in its proper use position. In an example, at one frequency range the audio transfer function between the external and internal microphones has one value when the nozzle is blocked by a finger and a different value when the wearable audio device is either in free air or in proper use position. For example, in the 1,500-3,000 Hz range there is a different response if the earbud nozzle is being blocked with the thumb, as compared to the earbud being in or out of the ear (which have a similar response). As another example, the transfer function for an earbud in the frequency range of 0-1,000 Hz may be low if the earbud is in free air and higher if the nozzle is blocked (either by a finger or by the earbud being sealed in the ear canal). Thus the transfer function can be an indication that the earbud is being handled and can be an indication that the earbud is in the ear. This determination can be used together with other determinations described herein to make the ultimate decision as to whether the wearable audio device is in its proper use position.

Figure 3:
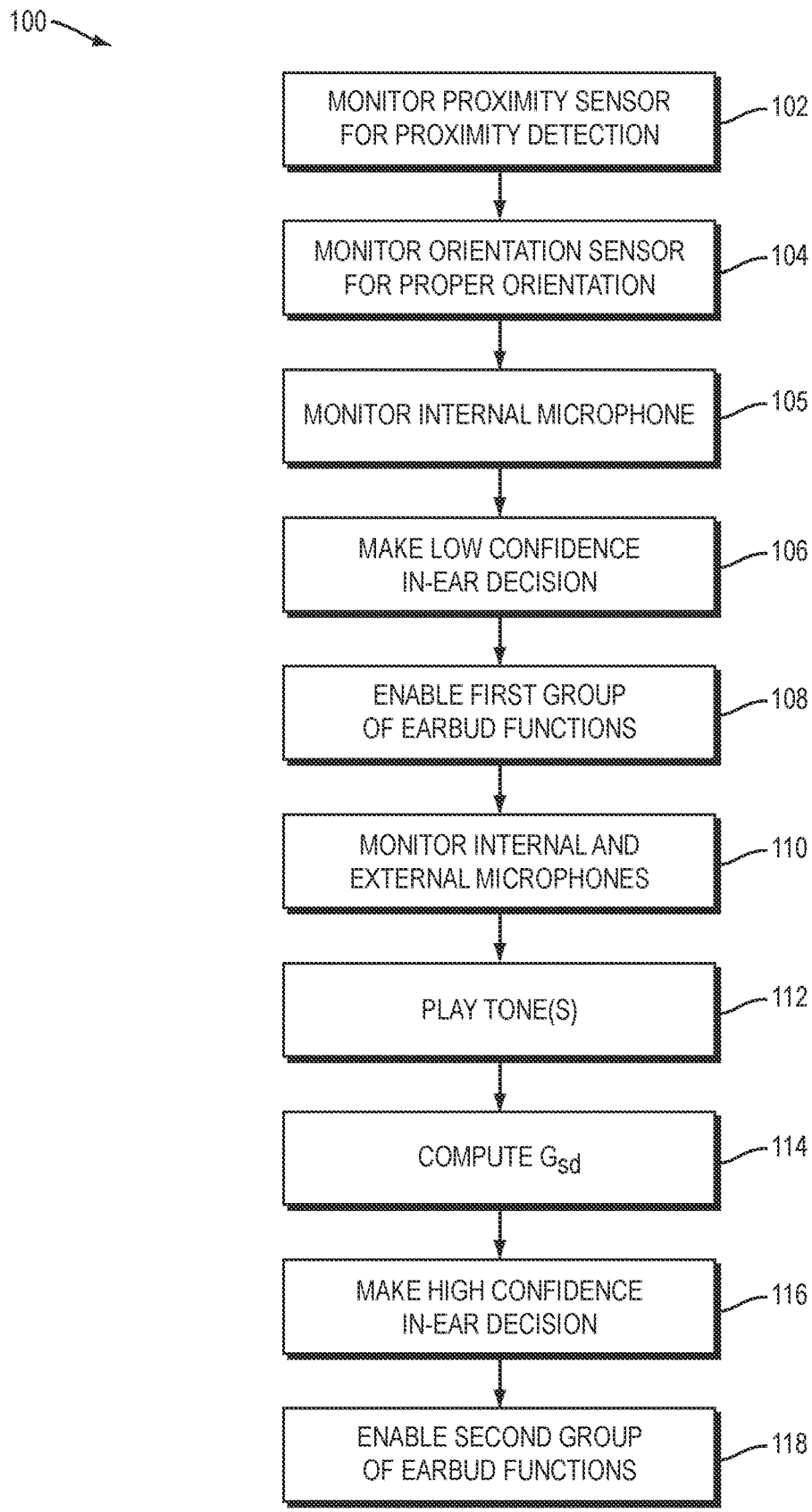
FIG. 3 is a flowchart of an operation of an earbud placement detection methodology.

FIG. 3 illustrates steps of a method 100 of detecting when a wearable audio device such as that described above is properly in place on the user's body. The proximity sensor is monitored for a proximity detection event, step 102. The orientation sensor is monitored for proper wearable audio device orientation, step 104. In an example both sensors are monitored at the same time. Once the proximity and orientation sensors reach a threshold that indicates a possible in-ear event, an internal microphone is monitored, step 105. In an example the microphone monitoring takes place in the 0-20 Hz range so as to detect when the wearable audio device is being handled by the user, and when an earbud is inserted into an ear, as described elsewhere herein. Based on the proximity sensor, orientation sensor, and internal microphone monitoring, a low confidence decision is made as to whether the device is in proper position (i.e., in place on the user's body), step 106. In this non-limiting example the device is an earbud, and so the decision is whether the device is in place in the ear. If the low-confidence in-ear decision is made, a first group of earbud functions are enabled, step 108. In some examples earbud functions that can be enabled based on this low-confidence decision include some or all of automatic power on/off, automatic pause/play of audio, automatic telephone call answering capability, Bluetooth connection/reconnection, beamforming of microphones carried by the wearable audio device, enablement of user interface functions, and tuning of an active noise reduction system. More specifically, in an example the functions that are enabled after the low-confidence decision are background functions, such as turning on processors, sensors, and Bluetooth. A result is that chips, sensors, and other aspects of the audio device that use power can remain off until the first level decision is made, thus saving battery power.

Method 100 then moves to a second level high confidence decision of the earbud being in place in the ear. The internal and external microphones are monitored, step 110. The driver is then enabled to play a tone or tones, step 112. A purpose of playing a tone is to receive the tone at the microphones and make a determination as to whether the receipt of the tone is as it would be expected to be if the wearable audio device is in proper use position and the user has stopped handling the wearable audio device. In the example of an earbud, the microphones that are used for this purpose include an internal microphone used for feedback-based active noise reduction and an external microphone used for feed-forward based active noise reduction. Both types of microphones are known in the field of active noise reduction for wearable audio devices and so are not further described herein. The internal microphone is typically located such that it is able to sense sound in a cavity formed by the driver, the earbud nozzle, and the ear canal. An example is microphone 80, FIG. 2. The external microphone is enabled to sense sound outside of the earbud housing. An example is microphone 81, FIG. 2. In method 100, the transfer function ($G_{sd}$) between the two microphones is determined, step 114. $G_{sd}$ determination is described in U.S. Pat. No. 10,462,551 entitled "Wearable Audio Device with Head On/Off State Detection", issued on Oct. 29, 2019, the entire disclosure of which is incorporated herein by reference for all purposes. The driver to microphone acoustic coupling (as exemplified by the transfer function) will change (at least at one or more frequencies) when the earbud is in the ear vs. out of the ear. In an example a processor of the wearable audio device is configured both to cause the electro-acoustic transducer to produce the sound after the processor has made the first level estimation that the wearable audio device is in place on the user's body, and to compute the transfer function. In an example the transfer function is computed over a specified frequency range, which can be in the range of 0-1,000 Hz. In some examples the sound(s) that are played are part of a device startup series of tones of the type that are common in electronic devices.

If the transfer function is as expected, a high confidence in-ear decision is made, step 116. In an example this high-confidence second-stage decision also involves the first stage decision (proximity to the user, proper orientation, and a decision based on a microphone that the user has stopped handling the wearable audio device). In other words, the device is considered (with low confidence) to be in its proper use position both when it is in the correct physical location and the user is not handling the device (which is expected to happen once the user is satisfied that the device is in place). In an example, as part of the second stage high-confidence decision, the blocked nozzle indicator is calculated at the same time as the $G_{sd}$ in the 0-1,000 Hz range. If the blocked nozzle calculation indicates that the nozzle is blocked then the high-confidence decision can be delayed by a short time, to ensure that the user has stopped handling the earbud. If after that time the indication of in-ear state remains, the high-confidence decision is made. After the second stage high-confidence decision is made, a second group of earbud functions are enabled, step 118. In some examples the functions of the second group are different than the functions of the first group. In an example the functions of the second group include both functions that involve interaction with the user (such as switches, capacitive touch sensors, and microphone beamforming) as well as tuning of the active noise reduction system. In some examples the multiple stages can run on different subsystems. For example there could be a sensor subsystem (using the proximity sensor, the orientation sensor, and the internal microphone) used in the first low-confidence stage and a microphone subsystem (using the internal and external microphones) used in the second stage high-confidence decision. This would enable the microphone subsystem to be turned on only when it was needed, to conserve power. This design would require some messaging between the subsystems.

In some examples monitoring of the proximity sensor and the orientation sensor continue during the second stage decision-making process. One reason is so that the wearable audio device can determine if it has been removed from its use position. For example, an earbud can be placed in the ear and then quickly removed. Or perhaps the user might keep adjusting it for a short time after it has been placed in the ear. By monitoring the proximity and/or orientation sensors through the entire startup sequence, there can be more confidence in the decision that the device is in place and the user has completed handling it. Also, continuous or periodic monitoring of the microphone(s) and calculation of the transfer function can be used to confirm when the device has been moved from its use position (e.g., removed from the ear). In some examples the processor can enable a timer that can be used as part of the in-place/out of place decision. For example if the high confidence decision remains for at least a short time (perhaps 1-2 seconds) there can be greater confidence that the user has stopped adjusting its position. Also, if the proximity sensor stops sensing proximity (which will happen if the earbud is removed from the ear) the timer can be used to turn off earbud functions only after a short time; this can help prevent erroneous out of position decisions that might be annoying to the user. For example, if the driver and external microphones are disabled when the device is removed from its use position, an erroneous decision can cut off telephone calls or music or podcasts against the wishes of the user.

Figure 4:
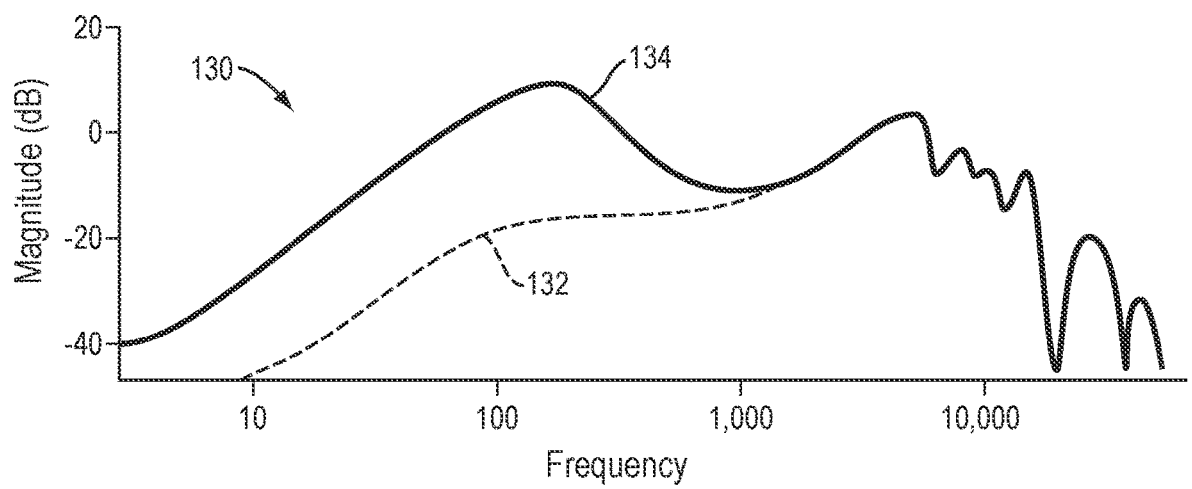
FIG. 4 illustrates the transfer function between an earbud external microphone and internal microphone with the earbud located in free space and located in the ear.

FIG. 4 is a graph 130 that illustrates the transfer function ($G_{sd}$) between an earbud external and internal microphone (as described above) over a frequency range up to about 10,000 Hz. Solid line 134 illustrates the transfer function when the earbud is in the ear, while dotted line 132 illustrates the transfer function when the earbud is in free space. As can be seen, at frequencies up to 1,000 Hz the magnitudes of the transfer functions differ. Accordingly, determining the transfer function in the range of 0-1,000 Hz is indicative of whether or not the earbud is in the ear.

Some examples of this disclosure relate to detecting placement of around the ear or on the ear headphones, with earcups that are configured to sit over or on the ears, respectively. The placement detection can be based on a proximity sensor such as a capacitive proximity sensor, a microphone that senses sound inside the earcup (as opposed to external environmental sounds) and an accelerometer, which may be but need not be a function of an IMU. As described below, in some examples these sensors are used to make a first-level decision that the headphones have been placed on the head, a second level decision that the headphones are in-place on the head and ready for use, and a third level decision that the headphones have been removed from the head.

In some examples the wearable audio device (e.g., on ear or over ear headphones) placement detection relies on three types of sensors—capacitive, microphones, and IMU/accelerometer. The placement detection algorithm can be considered to have multiple different phases. In a first phase, a capacitive sensor is used to detect if one or both of the earcups are over or around a user's ear (i.e., the headphones have been put on). In some examples there is a single capacitive sensor in/on one of the earcups. In other examples there is a capacitive sensor in each of the two earcups. The capacitive sensor (e.g., the electrode or conductive member of the sensor) is shaped to pick up the most deterministic parts of the ear using self-capacitance. Input from the capacitive sensor is monitored to determine if/when a threshold is satisfied that indicates an on-head event. This may be considered a lower-confidence decision that the user has placed the headphones on the head. If an on-head event is detected, a first group of one or more headphone functions are enabled. The first group of headphone functions may include one or more of: power on, automatic playback of audio, automatic telephone call answering capability, Bluetooth connection, beamforming of external microphones carried by the headphones, and enablement of user interface (UI) functions. In an example the functions that are enabled after the low-confidence decision are background functions, such as turning on processors, sensors, and Bluetooth. A result is that chips, sensors, and other aspects of the audio device that use power can remain off until the first level decision is made, thus saving battery power.

Then, once the input from the capacitive sensor has reached the threshold indicating an on-head event, a second phase is executed in which input from one or more internal microphones (e.g., feedback microphones used in an active noise reduction or ANR system) is monitored to detect the "end of don," which is when the user is done adjusting the headphones (i.e., the headphone cups are fully in place, or "donned"). In an example the microphone monitoring takes place in the 0-20 Hz range so as to detect when the wearable audio device is being handled by the user. After the second stage determination is made that the user has stopped handling the headphone, a second group of earbud functions are enabled. In some examples the functions of the second group are different than the functions of the first group. In an example the functions of the second group include both functions that involve interaction with the user (such as switches, capacitive touch sensors, and microphone beamforming) as well as tuning of the ANR system. In that regard, measurements for providing customized ANR are delayed until the "end of don" state is detected. Those measurements generally consist of playing a tone and measuring a response with the feedback microphone to measure the unique response of the user's ear canal. Customized ANR in headphones is described in U.S. Pat. No. 10,937,410, the entire disclosure of which is incorporated by reference herein for all purposes.

In some examples an inertial monitoring unit (IMU) or an accelerometer is used to detect when the headphone is laid flat/horizontal, indicative of an off-head state (i.e., the headphones are taken off, or "doffed"). The headphone will power off in response. In some examples input from the capacitive sensor is used in combination with the input from the IMU/accelerometer to make the determination that the headphone is in the off-head state. That is, input from the capacitive sensor can be monitored to detect when a user has removed the headphones, but the headphones will delay powering off until the input from the IMU/accelerometer is indicative of the headphones being laid down horizontally. This can help to prevent erroneous off-head detection. So, for example if the user only briefly removes the headphones to readjust, the headphones might not alter any functionality until the IMU/accelerometer exceeds some threshold. This helps to avoid interruption of headphone functions if, for example, the user has lifted one or both earcups, such as might be done if the headphones are adjusted after they have been donned.

In examples herein a wearable audio device includes an electro-acoustic transducer for producing sound, a proximity sensor that is configured to detect when the wearable audio device is close to a user, an internal microphone positioned within a housing of the wearable audio device and configured to detect sound in a cavity formed at least in part by a portion of the housing, and a processor that is configured to estimate, based on at least the proximity sensor, whether the wearable audio device is in place on the user's body, and to estimate, based on the internal microphone, whether the user has completed handling of the wearable audio device.

In an example the wearable audio device further includes at least one earcup that is configured to be located on or over an ear of a wearer when the wearable audio device is placed on the head, wherein the proximity sensor and the internal microphone are both positioned in an earcup. In some examples the proximity sensor comprises a capacitive proximity sensor. In an example the capacitive proximity sensor comprises a conductive member inside an earcup of the wearable audio device. In an example the conductive member has a curved outer perimeter that mimics a curve of a human pinna. In an example the wearable audio device further includes two earcups that are configured to be located on or over an ear of a wearer when the wearable audio device is placed on the head, wherein there is an internal microphone positioned within each earcup, and wherein the estimation of whether the user has completed handling of the wearable audio device is based on an internal microphone positioned within each of the earcups.

In some examples the processor is configured to initiate a first group of wearable audio device functions based on the estimation of whether the wearable audio device is in place on the user's body. In an example the processor is configured to initiate a second group of wearable audio device functions based on the estimation of whether the user has completed handling of the wearable audio device, wherein the functions of the second group are different than the functions of the first group. In an example the first and second groups of functions comprise at least one of: telephone call answering capability, Bluetooth connection, beamforming of microphones carried by the wearable audio device, playback of audio received from an external audio source, enablement of user interface functions, and tuning of an active noise reduction system.

In an example during at least the estimation of whether the user has completed handling of the wearable audio device the internal microphone is monitored at frequencies in the 0-20 Hz range. In an example the proximity sensor has an output, and the estimation by the processor of whether the wearable audio device is in place on the user's body is in part based on a level of the proximity sensor output. In some examples after the processor estimates whether the wearable audio device is in place on the user's body the processor is configured to enable predetermined wearable audio device functions. In an example the predetermined wearable audio device functions comprise at least one of: telephone call answering capability, Bluetooth connection, beamforming of microphones carried by the wearable audio device, playback of audio received from an external audio source, enablement of user interface functions, and tuning of an active noise reduction system. In an example the processor is further configured to initiate an active noise reduction (ANR) filter determination procedure after an estimation that the user has completed handling the wearable audio device.

In some examples the wearable audio device further includes an orientation sensor that is configured to detect an orientation of the wearable audio device. In an example the processor is further configured to estimate, based at least on the orientation sensor, whether the user has removed the wearable audio device from the user's body. In an example the processor is configured to reduce power usage based on the estimation of whether the user has removed the wearable audio device from the user's body. In an example the estimation of whether the user has removed the wearable audio device from the user's body is further based on the proximity sensor. In an example the processor estimation of whether the wearable audio device is in place on the user's body is based on the proximity sensor and the orientation sensor. In an example the orientation sensor comprises an accelerometer.

Figure 5:
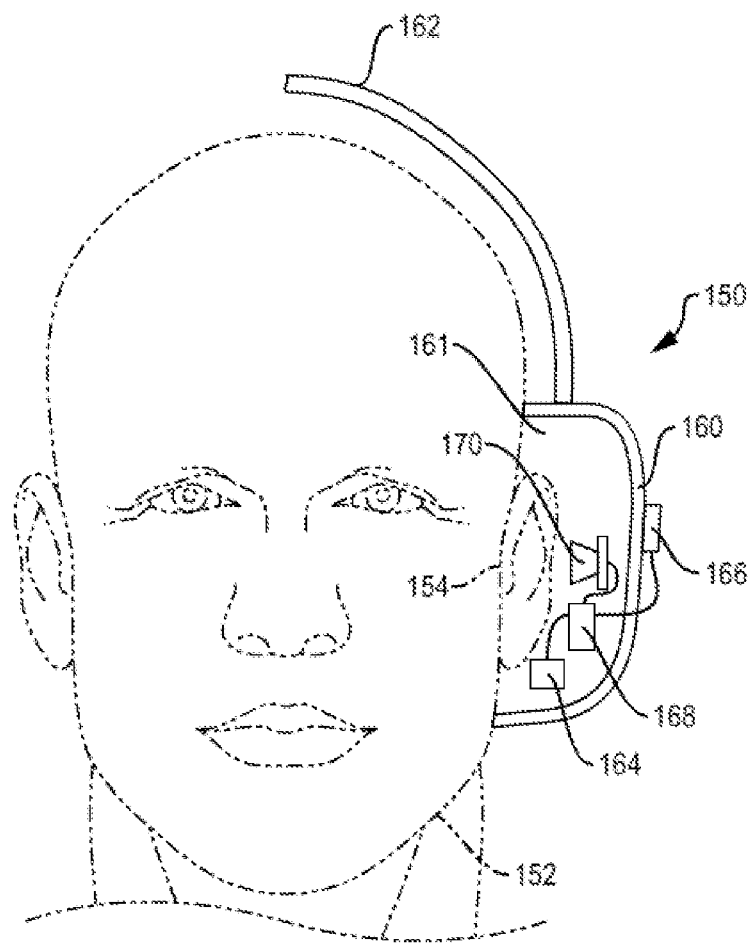
FIG. 5 is a partial schematic cross-sectional view of an over the ear headphone in place on a user's head.

FIG. 5 is a schematic cross-sectional view of an over the ear headphone 150 in place on user's head 152. Only one earcup 160 is shown located over ear 154, and defining internal cavity 161 between earcup 160 and head 152/ear 154. In most but not all cases the headphones include two essentially identical earcups, one over each ear, and mechanically connected by headband 162. For on-ear headphones the earcup is designed to sit on the external ear or pinna rather than over it. Headphone 150 includes electro-acoustic transducer 170 and internal microphone 164, located such that transducer 170 creates sound pressure in cavity 161 and microphone 164 senses sound pressure in cavity 161. External microphone 166 is located so as to sense sound external to earcup 160. Processor 168 is operatively connected to microphones 164 and 168 and transducer 170. Headphone 150 also includes a proximity sensor (not shown) that is configured to detect when the headphones are close to the use. Exemplary proximity sensors are further described below in reference to FIG. 6. Other typical hardware and functions of headphones are not shown or described.

Figure 6:
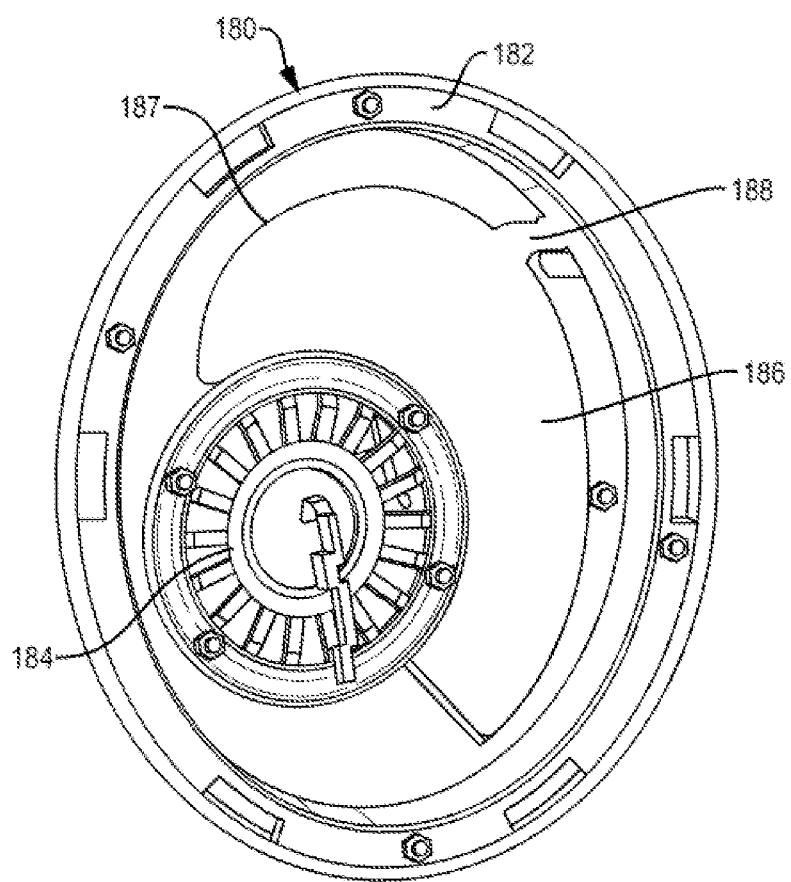
FIG. 6 is a partial interior view of an earcup for an over the ear headphone.

FIG. 6 is an interior view of a frame 180 for an earcup for an over the ear headphone. Frame rim 182 would carry a cushion (not shown). Area 184 is where the electro-acoustic transducer (not shown) is located. Conductive member 186 is located on the inner surface of frame 180. Conductive member 186 is configured as a capacitive proximity sensor that is used to detect proximity of the earcup to the user's skin (e.g., the ear or pinna). When conductive member 186 is close to the skin the capacitance changes. The capacitance level in some cases is indicative of the proximity of the conductive member 186 to the skin. Thus the level of capacitance can be used as a threshold indication of the placement of the earcup on or over the ear. The processor (not shown) is configured to measure this capacitance change via trace 188 that leads to the processor. Conductive member 186 has a location in the earcup and shape such that it is configured to overlie at least a portion of a human outer ear or pinna when the earcup is worn. The size, location and shape of conductive member 186 thus increases the likelihood that the ear will be sensed. In some examples the sensing of the ear is used as a first, low-level indication that the user has placed the headphones on the head. As explained in more detail elsewhere herein, in some examples the processor is configured to enable one or more functions of the headphones based at least in part on the proximity sensor. A proximity sensor may be located in one, or in both, earcups.

Figure 7:
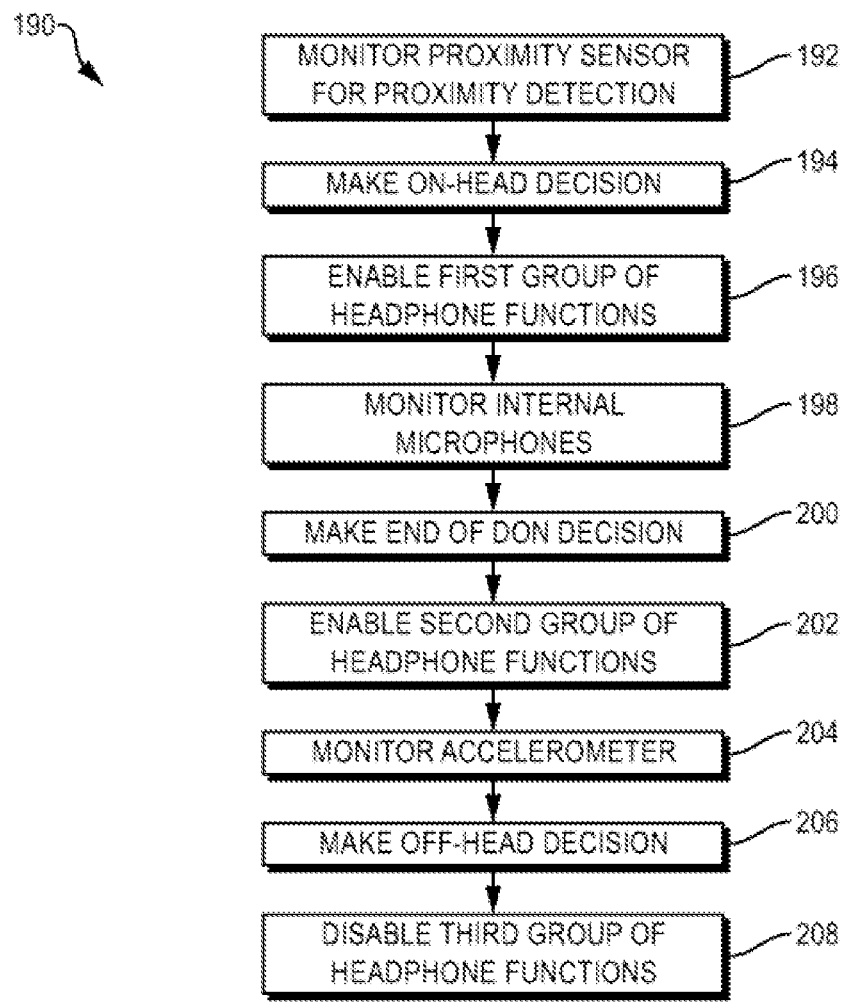
FIG. 7 is a flowchart of an operation of a headphone donning and doffing detection methodology.

FIG. 7 illustrates a method 190 of an operation of a headphone donning and doffing detection methodology. The methodology involves a first decision of whether the headphones have been placed on the head, a second decision that the headphones have been fully donned (in other words that they are in place on or over the ears and are ready for use), and a third decision that the headphones have been removed from the head or doffed.

At step 192, the processor is monitoring the proximity sensor for detection of proximity to the head. In some examples there is a proximity sensor that is part of only one of the two earcups. In other examples there are two proximity sensors, one that is part of each of the two earcups. When the head is sensed an on-head decision is made, step 194, and then a first group of headphone functions in enabled, step 196. The on-head decision may be considered a low-confidence decision since it is based on only a single sensor. In some examples this first group of headphone functions includes one or more of: power on, automatic playback of audio enabled, automatic telephone call answering enabled, Bluetooth connection, beamforming of microphones carried by the headphones, and enablement of UI functions. In an example the functions that are enabled are background functions such as turning on processors, sensors, and Bluetooth. A result is that chips, sensors, and other aspects of the headphones that use power can remain off until the on-head decision is made. This saves power.

A second-level decision that the headphones are fully donned and ready for use is based on monitoring one or more internal microphones of one or both earcups, step 198. The microphones may be the feedback microphones of a headphone ANR system. In an example at least one microphone in each earcup is monitored, to detect when the user stops touching or moving both earcups, which typically happens for a short time after the headphones are placed on the head while the user is adjusting the locations of the earcups for more comfort and better audio results. In an example the microphone output is monitored in the approximately 0-20 Hz range. This range is selected in part because sounds/vibrations in this range are typically not affected by ANR systems, so the response is expected to be the same regardless of whether any ANR is enabled. When a low threshold of sound monitored in the 0-20 Hz range is reached, an end of don decision is made, step 200, and a second group of headphone functions is enabled, step 202. In some examples the functions of the second group are different than the functions of the first group. In an example the functions of the second group include both functions that involve interaction with the user (such as switches, capacitive touch sensors, and microphone beamforming) as well as tuning of the ANR system. In some examples measurements for providing customized ANR are delayed until the "end of don" state is detected. Those measurements generally consist of playing a tone and measuring a response with the feedback microphone to measure the unique response of the user's ear canal.

A third sensed state is when the user has doffed or removed the headphones. In some examples one or both of the proximity sensor and an inertial monitoring unit (IMU) or an accelerometer are monitored, step 204, to detect when the headphone is laid flat/horizontal, indicative of the decision by the processor of an off-head state (i.e., the headphones are taken off, or "doffed"), step 206. In response the processor is enabled to disable one or more headphone functions, step 208. In some examples the headphone will power off in response to an off-head detection. In examples where an accelerometer is used to detect orientation, when the headphones are on the head in a normal upright head position there is a steady-state acceleration due to gravity in one direction, which may be called the "vertical" direction, and no acceleration in the two orthogonal directions. When the headphones are taken off and laid more or less flat, the steady state acceleration will not be in the original axis. The processor thus is able to use the accelerometer to determine whether the headphones have been laid flat.

In some examples input from the proximity sensor (e.g., the capacitive proximity sensor) is used in combination with the input from the IMU/accelerometer to make the determination that the headphone is in the off-head state. In some examples input from the proximity sensor is monitored to detect when a user has removed the headphones, but the headphones delay powering off until the input from the IMU/accelerometer is indicative of the headphones being laid down horizontally. This can help to prevent erroneous off-head detection. So, for example if the user only briefly removes the headphones or earcups to readjust them, the headphones might not alter any functionality until the proximity sensor exceeds some threshold. This helps to avoid interruption of headphone functions if, for example, the user has lifted one or both earcups, such as might be done if the headphones are adjusted after they have been donned, or if the head is briefly tilted to the side.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other examples are within the scope of the following claims.

What is claimed is:

1. A wearable audio device, comprising:
   an electro-acoustic transducer for producing sound;
   a proximity sensor that is configured to detect when the wearable audio device is close to a user;
   an internal microphone positioned within a housing of the wearable audio device and configured to detect sound in a cavity formed at least in part by a portion of the housing; and
   a processor that is configured to:
      estimate, based on at least the proximity sensor, whether the wearable audio device is in place on the user's body, and to estimate, based on the internal microphone, whether the user has completed handling of the wearable audio device; and
      estimate, based on the internal microphone, whether the user has completed handling of the wearable audio device after the estimating, based on at least the proximity sensor, whether the wearable audio device is in place on the user's body.

2. The wearable audio device of claim 1, further comprising at least one earcup that is configured to be located on or over an ear of a wearer when the wearable audio device is placed on the head, wherein the proximity sensor and the internal microphone are both positioned in an earcup.

3. The wearable audio device of claim 1, wherein the proximity sensor comprises a capacitive proximity sensor, wherein the capacitive proximity sensor comprises a conductive member inside an earcup of the wearable audio device.

4. The wearable audio device of claim 3, wherein the conductive member is configured to overlie at least a portion of a human pinna.

5. The wearable audio device of claim 1, further comprising two earcups that are configured to be located on or over an ear of a wearer when the wearable audio device is placed on the head, wherein there is an internal microphone positioned within each earcup, and wherein the estimation of whether the user has completed handling of the wearable audio device is based on an internal microphone positioned within each of the earcups.

6. The wearable audio device of claim 1, wherein the processor is configured to initiate a first group of wearable audio device functions based on the estimation of whether the wearable audio device is in place on the user's body.

7. The wearable audio device of claim 6, wherein the processor is configured to initiate a second group of wearable audio device functions based on the estimation of whether the user has completed handling of the wearable audio device, wherein the functions of the second group are different than the functions of the first group, wherein the first and second groups of functions comprise at least one of: telephone call answering capability, Bluetooth connection, beamforming of microphones carried by the wearable audio device, playback of audio received from an external audio source, enablement of user interface functions, and tuning of an active noise reduction system.

8. The wearable audio device of claim 1, wherein during at least the estimation of whether the user has completed handling of the wearable audio device the internal microphone is monitored at frequencies in the 0-20 Hz range.

9. The wearable audio device of claim 1, wherein the proximity sensor has an output, and the estimation by the processor of whether the wearable audio device is in place on the user's body is in part based on a level of the proximity sensor output.

10. The wearable audio device of claim 1, wherein after the processor estimates whether the wearable audio device is in place on the user's body the processor is configured to enable predetermined wearable audio device functions including at least one of: telephone call answering capability, Bluetooth connection, beamforming of microphones carried by the wearable audio device, playback of audio received from an external audio source, enablement of user interface functions, and tuning of an active noise reduction system.

11. The wearable audio device of claim 1, wherein the processor is further configured to initiate an active noise reduction (ANR) filter determination procedure after an estimation that the user has completed handling the wearable audio device.

12. The wearable audio device of claim 1, further comprising an orientation sensor that is configured to detect an orientation of the wearable audio device, wherein the processor is further configured to estimate, based at least on the orientation sensor, whether the user has removed the wearable audio device from the user's body.

13. The wearable audio device of claim 12, wherein the processor is configured to reduce power usage based on the estimation of whether the user has removed the wearable audio device from the user's body.

14. The wearable audio device of claim 12, wherein the estimation of whether the user has removed the wearable audio device from the user's body is further based on the proximity sensor.

15. The wearable audio device of claim 12, wherein the processor estimation of whether the wearable audio device is in place on the user's body is based on the proximity sensor and the orientation sensor.

16. The wearable audio device of claim 1, wherein estimating whether the wearable audio device is in place on the user's body based on at least the proximity sensor has a lower relative confidence than estimating whether the user has completed handling of the wearable audio device based on the internal microphone.

17. An in-ear wearable audio device, comprising:
an electro-acoustic transducer for producing sound;
a proximity sensor that is configured to detect when the wearable audio device is close to a user;
an internal microphone positioned within a housing of the wearable audio device and configured to detect sound in a cavity formed at least in part by a portion of the housing;
an external microphone positioned on the housing of the wearable audio device and configured to detect sound external to the cavity; and
a processor that is configured to:
  estimate, based on at least the proximity sensor, whether the wearable audio device is in place on the user's body, and
  after estimating whether the wearable audio device is in place on the user's body, to estimate, based on the internal microphone, whether the user has completed handling of the wearable audio device, and
  after estimating whether the user has completed handling of the wearable audio device, estimate, based on the internal microphone and the external microphone, whether the wearable audio device is positioned in the user's ear.

18. The in-ear wearable audio device of claim 17, wherein the proximity sensor comprises a capacitive proximity sensor with a conductive member inside an earcup of the wearable audio device.

19. A wearable audio device, comprising:
an electro-acoustic transducer for producing sound;
a proximity sensor that is configured to detect when the wearable audio device is close to a user;
an internal microphone positioned within a housing of the wearable audio device and configured to detect sound in a cavity formed at least in part by a portion of the housing; and
a processor that is configured to estimate, based on at least the proximity sensor, whether the wearable audio device is in place on the user's body, and to estimate, based on the internal microphone, whether the user has completed handling of the wearable audio device,
wherein the proximity sensor comprises a capacitive proximity sensor, wherein the capacitive proximity sensor comprises a conductive member inside an earcup of the wearable audio device.

20. The wearable audio device of claim 19, wherein the earcup is configured to be located on or over an ear of a wearer when the wearable audio device is placed on the head, wherein the proximity sensor and the internal microphone are both positioned in the earcup.

21. A wearable audio device, comprising:
two earcups that are configured to be located on or over an ear of a user when the wearable audio device is placed on the head of the user;
an internal microphone positioned within each earcup;
an electro-acoustic transducer for producing sound;
a proximity sensor that is configured to detect when the wearable audio device is close to the user;
an internal microphone positioned within a housing of the wearable audio device and configured to detect sound in a cavity formed at least in part by a portion of the housing; and
a processor that is configured to estimate, based on at least the proximity sensor, whether the wearable audio device is in place on the user's body, and to estimate, based on the internal microphone, whether the user has completed handling of the wearable audio device,
wherein the estimation of whether the user has completed handling of the wearable audio device is based on the internal microphone positioned within each of the earcups.

22. The wearable audio device of claim 21, wherein the proximity sensor is positioned in one of the two earcups.

23. A wearable audio device, comprising:
an electro-acoustic transducer for producing sound;
a proximity sensor that is configured to detect when the wearable audio device is close to a user;
an internal microphone positioned within a housing of the wearable audio device and configured to detect sound in a cavity formed at least in part by a portion of the housing; and
a processor that is configured to:
  estimate, based on at least the proximity sensor, whether the wearable audio device is in place on the user's body, and to estimate, based on the internal microphone, whether the user has completed handling of the wearable audio device, and
  initiate a first group of wearable audio device functions based on the estimation of whether the wearable audio device is in place on the user's body.

24. The wearable audio device of claim 23, further comprising an orientation sensor that is configured to detect an orientation of the wearable audio device.

25. A wearable audio device, comprising:
an electro-acoustic transducer for producing sound;
a proximity sensor that is configured to detect when the wearable audio device is close to a user;
an internal microphone positioned within a housing of the wearable audio device and configured to detect sound in a cavity formed at least in part by a portion of the housing; and
a processor that is configured to:
  estimate, based on at least the proximity sensor, whether the wearable audio device is in place on the user's body, and to estimate, based on the internal microphone, whether the user has completed handling of the wearable audio device, and
  after estimating that the wearable audio device is in place on the user's body, enabling predetermined wearable audio device functions.

26. The wearable audio device of claim 25, further comprising an orientation sensor that is configured to detect an orientation of the wearable audio device.

* * * * *